No. 621,272. Patented Mar. 14, 1899.
B. McGOVERN.
AUTOMATIC TIRE SETTING MACHINE.
(Application filed May 23, 1898.)
(No Model.) 6 Sheets—Sheet 1.
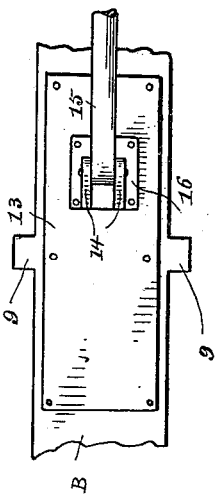
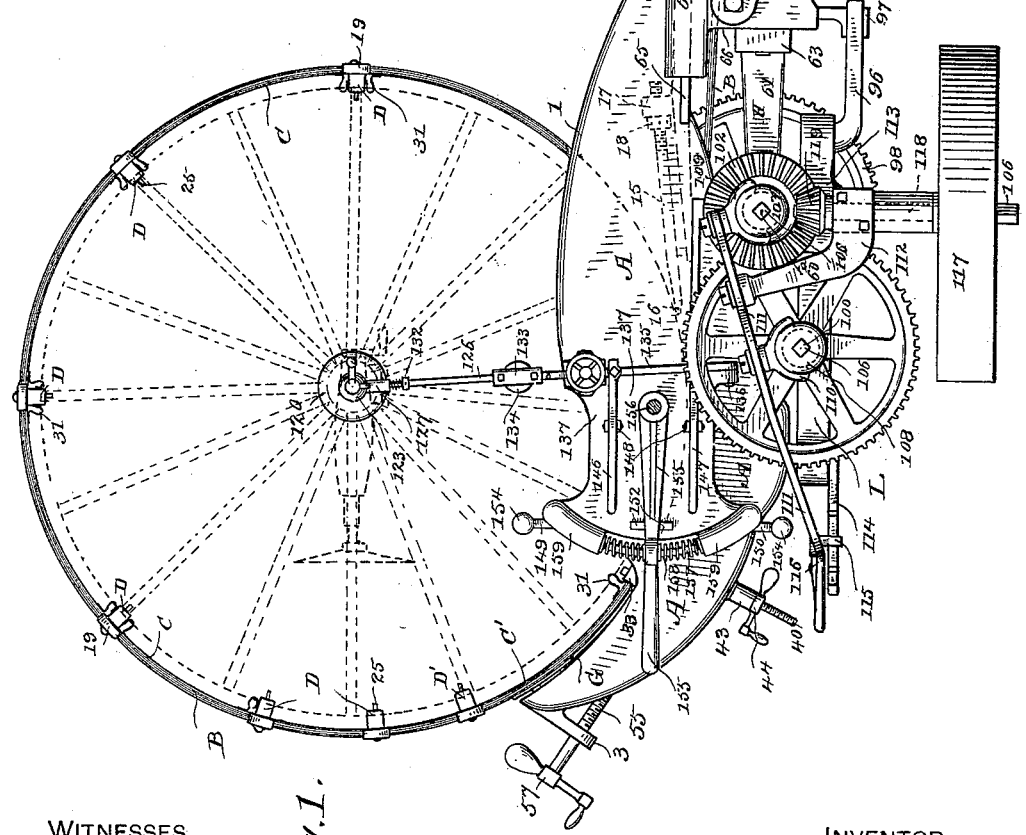
WITNESSES
INVENTOR
Bernard McGovern
By
A. M. Wooster
Atty.

No. 621,272. Patented Mar. 14, 1899.
B. McGOVERN.
AUTOMATIC TIRE SETTING MACHINE.
(Application filed May 23, 1898.)
(No Model.) 6 Sheets—Sheet 2.
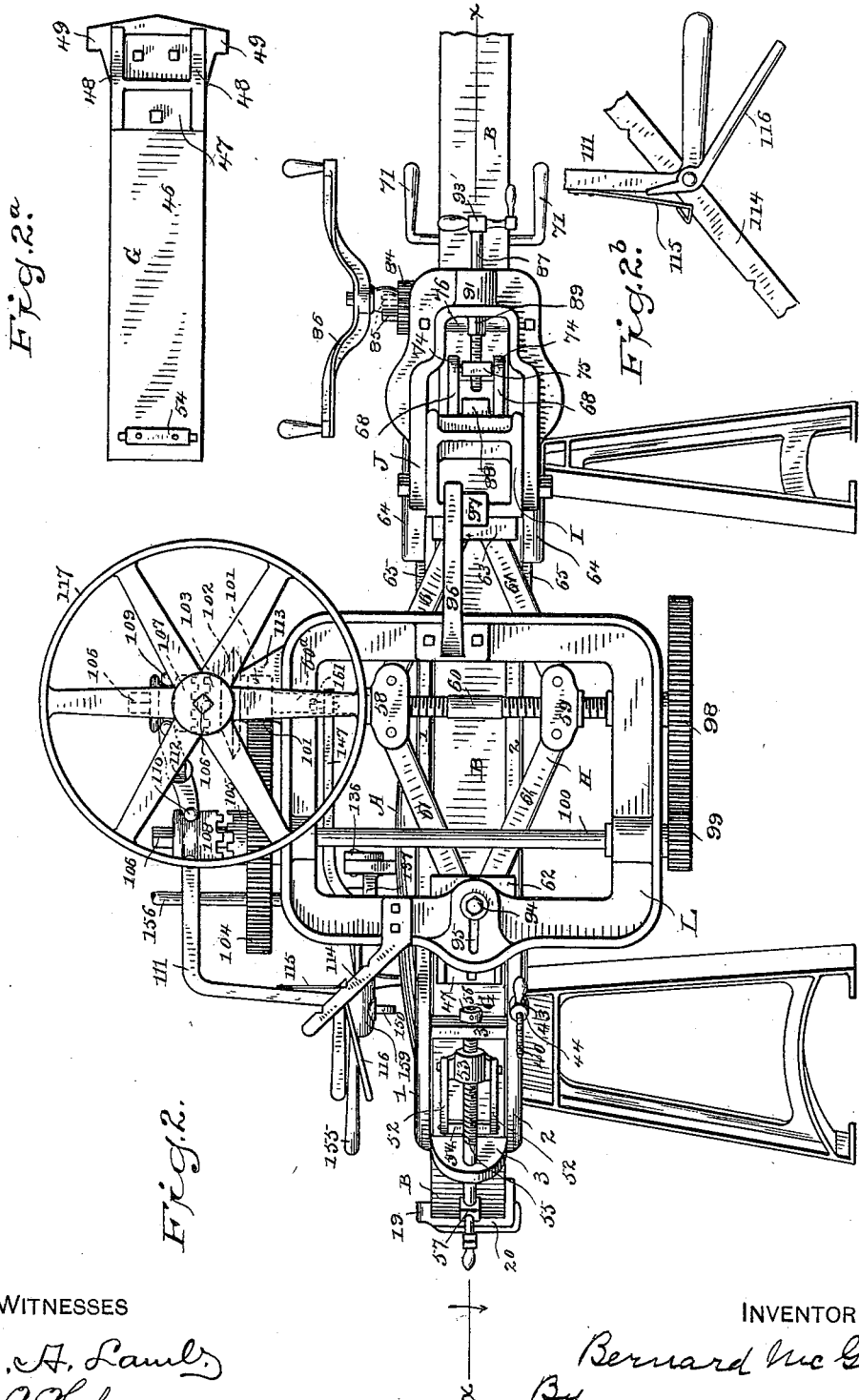
WITNESSES
INVENTOR
Bernard McGovern
By A. M. Wooster
Atty.

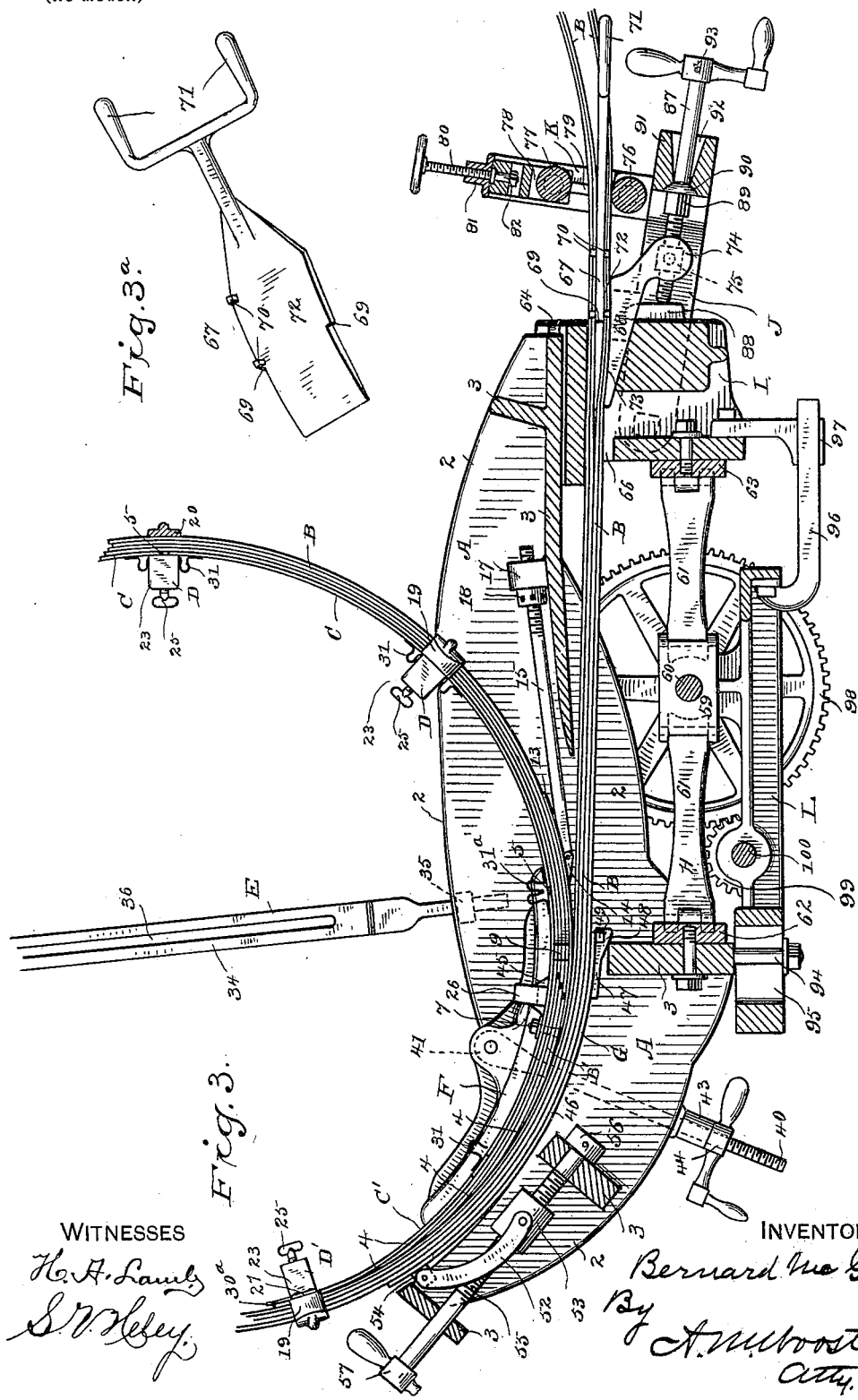

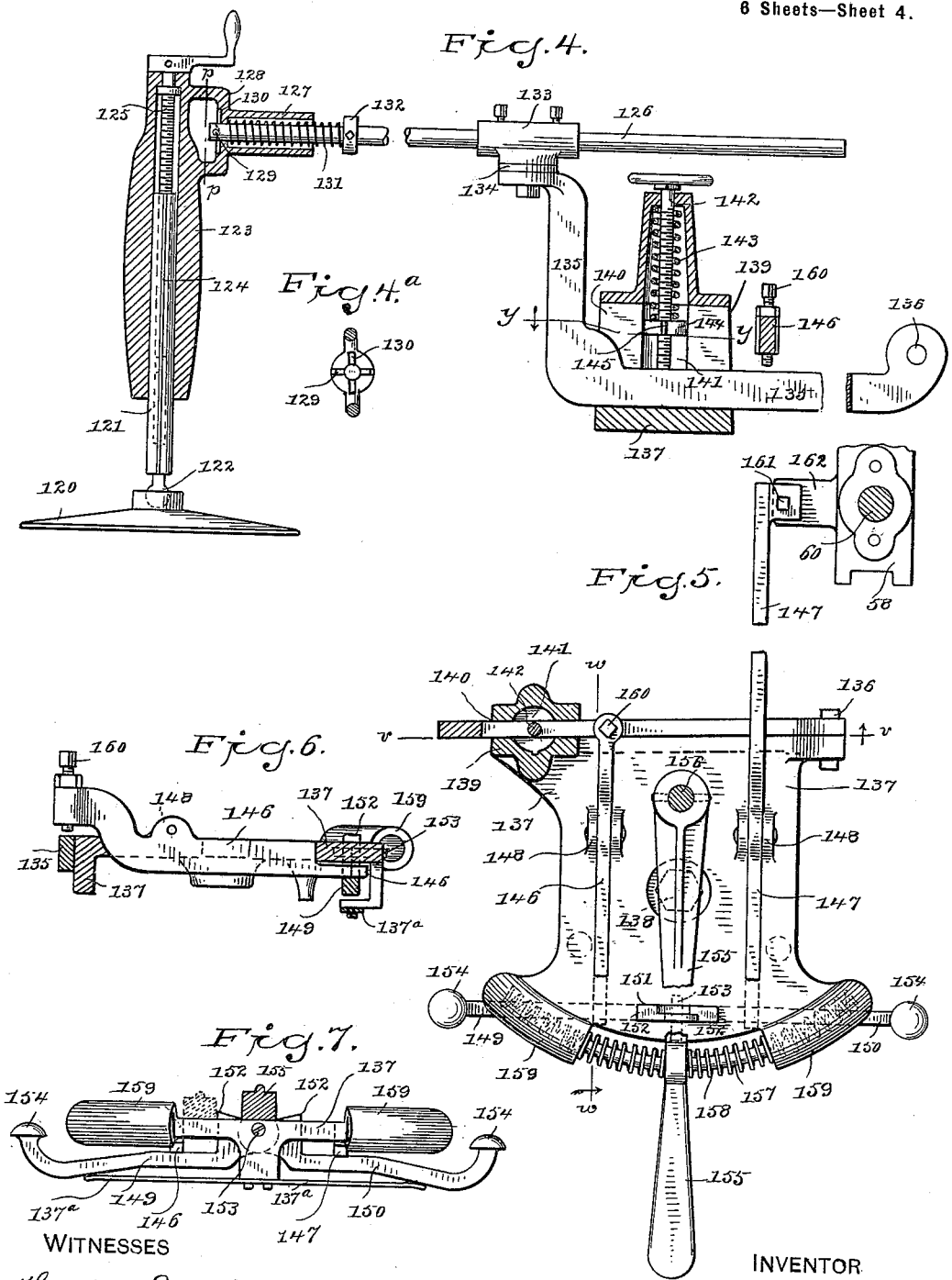

No. 621,272. Patented Mar. 14, 1899.
B. McGOVERN.
AUTOMATIC TIRE SETTING MACHINE.
(Application filed May 23, 1898.)
(No Model.) 6 Sheets—Sheet 5.
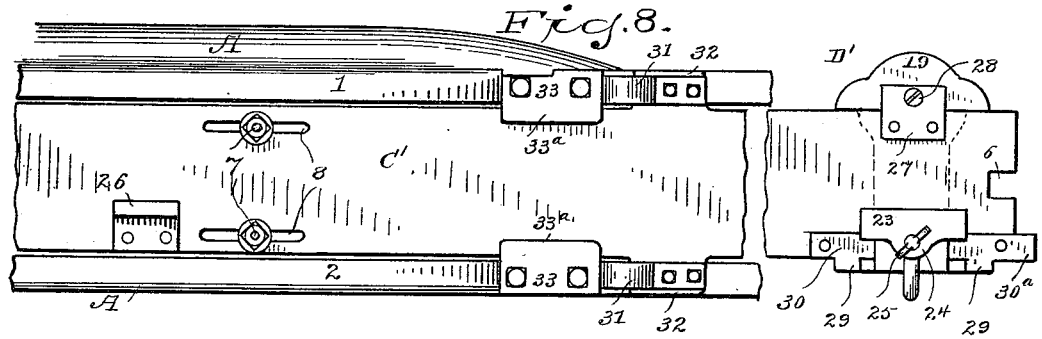
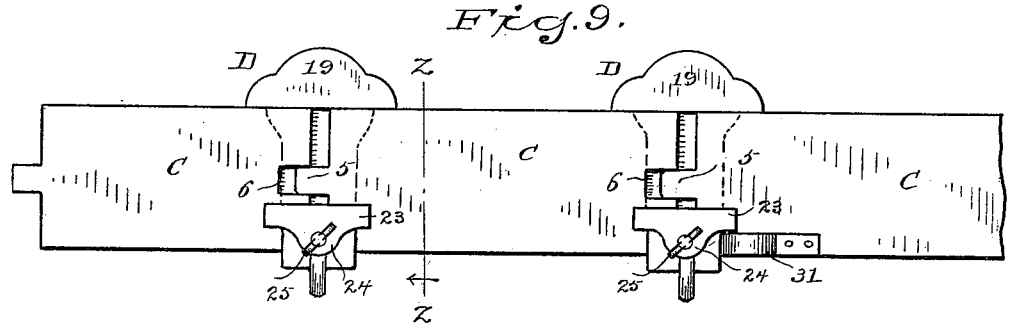
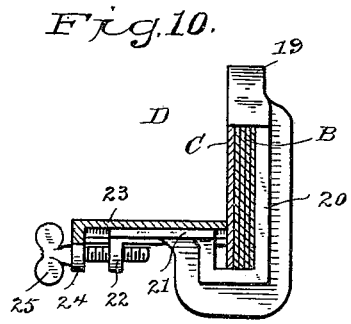
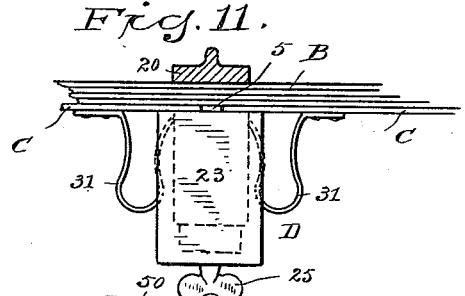
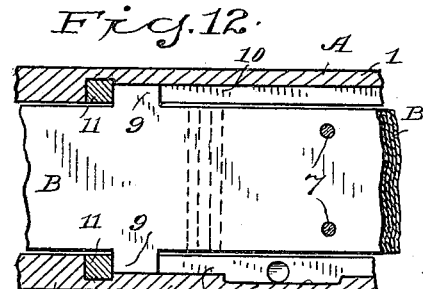
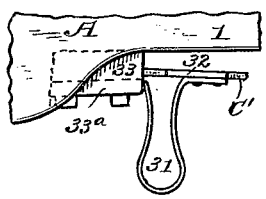
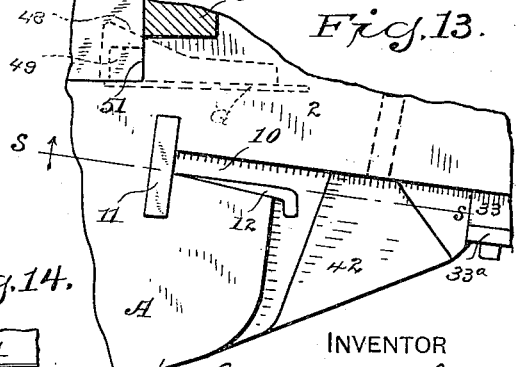
WITNESSES
H. A. Lantz
S. V. Holey
INVENTOR
Bernard McGovern
By A. M. Wooster
Atty.
THE NORRIS PETERS CO., PHOTO-LITHO., WASHINGTON, D. C.

No. 621,272. Patented Mar. 14, 1899.
B. McGOVERN.
AUTOMATIC TIRE SETTING MACHINE.
(Application filed May 23, 1898.)
(No Model.) 6 Sheets—Sheet 6.
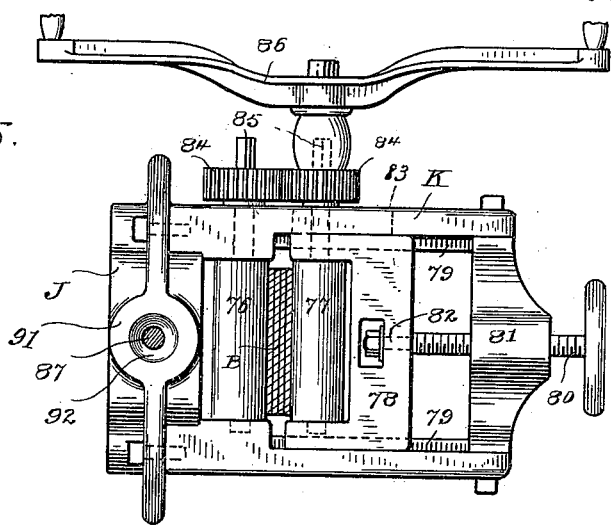
Fig. 15.
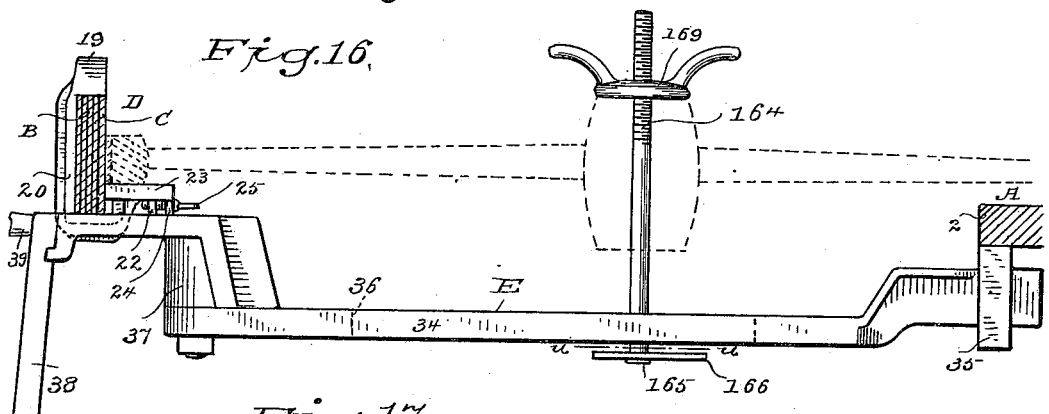
Fig. 16.
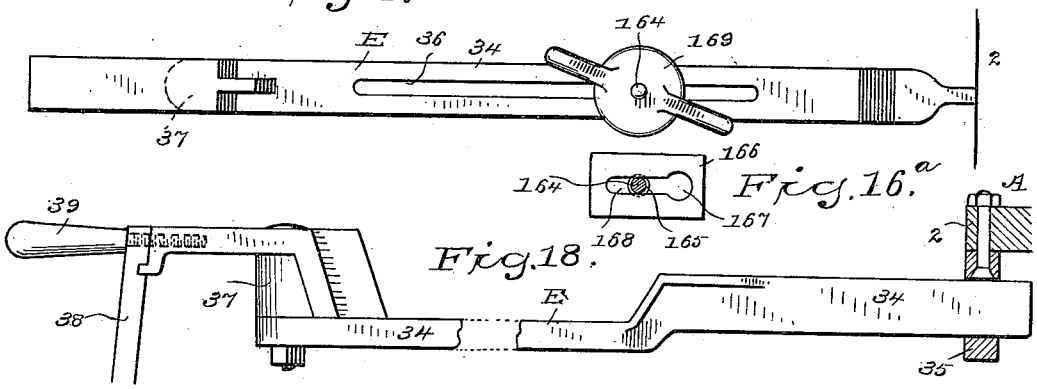
Fig. 17.
Fig. 16ᵃ.
Fig. 18.
WITNESSES
H. A. Lamb
S. V. Haley
INVENTOR
Bernard McGovern
By
A. M. Wooster
Atty.
THE NORRIS PETERS CO., PHOTO-LITHO., WASHINGTON, D. C.

UNITED STATES PATENT OFFICE.

BERNARD McGOVERN, OF NORWALK, CONNECTICUT.

AUTOMATIC TIRE-SETTING MACHINE.

SPECIFICATION forming part of Letters Patent No. 621,272, dated March 14, 1899.

Application filed May 23, 1898. Serial No. 681,423. (No model.)

*To all whom it may concern:*

Be it known that I, BERNARD MCGOVERN, a citizen of the United States, residing at Norwalk, county of Fairfield, State of Connecticut, have invented a new and useful Automatic Tire-Setting Machine, of which the following is a specification.

My invention has for its object to produce an automatic power-machine for setting tires on vehicle-wheels which will work equally well upon light and heavy wheels, and whether the wheels are large or small or new or old, and whether the tires are new or have been worn thin from long-continued use. With these ends in view I have devised the novel automatic power-machine of which the following description, in connection with the accompanying drawings, is a specification, reference characters being used to indicate the several parts.

Figure 1 is a plan view of the machine complete, the operative parts being in position to set a tire; Fig. 1$^a$, an enlarged detail view showing, in connection with Figs. 1 and 3, a device for strengthening the attachment of the inner ends of the straps to the frame; Fig. 2, a front elevation, the position of the parts corresponding with Fig. 1; Fig. 2$^a$, an enlarged detail view of the outer forming-plate; Fig. 2$^b$, an enlarged detail view of the device for locking the clutch-operating lever after adjustment; Fig. 3, a horizontal sectional view, on an enlarged scale, on the line $x\,x$ in Fig. 2; Fig. 3$^a$, a perspective view of the inner wedge; Fig. 4, an enlarged detail view, partly in vertical section, on the line $v\,v$ in Fig. 5, illustrating the automatic tripping mechanism by which the action of the toggle is controlled; Fig. 4$^a$, a detail sectional view on the line $p\,p$ in Fig. 4; Fig. 5, a detail plan view, partly in horizontal section, on the line $y\,y$ in Fig. 4, the scale being reduced, showing the stopping and starting lever which is tripped automatically by the mechanism illustrated in Fig. 4; Fig. 6, a sectional view on the line $w\,w$ in Fig. 5, the starting-lever and one of the tripping-levers being omitted; Fig. 7, an elevation as seen from the front in Fig. 5, the starting-lever being in section; Fig. 8, an inner face view showing the section of the sectional band, which for convenience in description I shall term the "first" section; Fig. 9, an inner face view showing short sections of the band; Fig. 10, a section of the band and straps on the line $z\,z$ in Fig. 9, one of the rests being in elevation; Fig. 11, a plan view of one of the rests with the clip in horizontal section; Fig. 12, an inner face view showing the mode in which the straps are anchored in the frame, the latter being in section on the line $s\,s$ in Fig. 13; Fig. 13, a view of a portion of the lower plate of the frame, one of the cross-webs being in section; Fig. 14, a detail plan view corresponding with Fig. 8; Fig. 15, an enlarged end view of the yoke, the inner and outer wedges being removed and the band-tightening rollers in operative position. Figs. 16 and 17 are respectively an elevation and a plan view, on an enlarged scale, illustrating the construction and operation of the extension-leg by which the outer edge of a wheel and tire are supported in use, and also illustrating a hand device which may be used in lieu of the automatic mechanism illustrated in Figs. 4 and 5 for regulating the dish of a wheel in setting a tire; Fig. 16$^a$, a detail sectional view on the line $u\,u$ in Fig. 16; and Fig. 18 is another elevation of the extension-leg, the central portion thereof being broken away and showing the leg extended, as when supporting a large-sized wheel.

A denotes the frame of the machine, which may be of any suitable construction and which I have shown as comprising an upper plate 1 and a lower plate 2, connected by webs 3. The tires are set in use by compressing about them a series of metallic (ordinarily steel) straps B. The inner ends of these straps are curved, so as to encircle the tire to be set, as clearly shown in Figs. 1 and 3, said inner ends being anchored in the frame and the free ends extending outward tangentially and being detachably secured to a sliding carriage, as will presently be fully explained. Any convenient number of straps may be used—for example, four, as shown in the drawings. The straps lie one within the other, their outer faces at the inner ends being beveled, as at 4, (see Fig. 3,) and the inner ends of the outer straps (three, as shown in the drawings) being separated from the main portions thereof, the separated ends of the outer straps being indicated by B'. This permits the straps to adapt themselves to tires of any size, lessens friction, and assists in distributing the strain equally. The compressive action of the straps is transmitted to the tire by a sectional band C, lying within the straps. The sections of which this band is comprised are made from three to twelve inches in length. In addition to the permanent sections a sufficient number of different lengths of shorter sections is provided to adapt the band to fit either large or small sized wheels, any size of wheel from thirty to sixty inches in diameter being easily within the compass of the machine. The ends of each section of the band are provided respectively, with a projection 5 and a slot 6 to engage the contiguous sections. In use the sections of the band are placed as in Fig. 9, the slots being engaged by the projections, but the ends of the sections being separated sufficient distance to permit the necessary closing together of the sections in exerting compressive action upon the tire. When strain is applied to the straps, the sections of the band are forced toward each other endwise, thereby distributing the compressive strain upon the entire circumference of the tire.

In changing the adjustment of the machine from a large to a smaller sized wheel, or vice versa, only one or more of the short sections of the band require to be changed, the other sections remaining permanently in the machine. The separated ends B' of the outer straps are secured to each other and to the inner strap by bolts 7, which also pass through slots 8 in one of the sections of sectional band C, which for convenience in description I shall term the "first" section and have indicated by C'. (See Figs. 3 and 8.) The inner ends of the straps are provided on both edges with lugs 9, by means of which they are anchored to the frame.

10 (see Figs. 12 and 13) indicates grooves in plates 1 and 2 of the frame, which are engaged by these lugs, and 11 denotes steel blocks, cast into or otherwise rigidly secured to the plates, which take the strain upon the straps and prevent the possibility of the lugs plowing out of the casting.

12 (see Fig. 13) denotes a key which in practice is used to lock the ends of the straps in slots 10, so as to hold them perfectly tight.

In order to prevent the straps from curving or bowing outward under the enormous strain to which they are frequently subjected in use, I provide, in addition to the lugs 9, which engage the plates of the frame, a central support, which is clearly shown in Fig. 3, in addition to which see Fig. 1ª.

13 denotes a plate which is riveted to the outer strap and carries lugs 14, to which a brace-rod 15 is pivoted. In the present instance I have shown lugs 14 as cast upon a plate 16, which is itself riveted to plate 13. These details of construction, however, are not of the essence of my invention. The free end of the brace-rod is threaded and extends forward (see Fig. 3) and lies between lugs 17, (one only being shown in the drawings,) which are cast upon one of the webs 3 between the plates of the frame. A nut 18 on the threaded portion of the rod bears against the inner face of the lugs and when tightened up thrusts the brace-rod against the center of the straps and renders bowing of the straps at their point of attachment to the frame impossible.

In use the wheel and the tire that is being set thereon are supported by rests D, the construction of which will be clearly understood from Fig. 10. Each rest comprises a clip having a head 19, which rests upon the straps and sectional band, a body 20, which partly incloses the straps and band, and a plate 21, which lies within the band and is provided on its under side with a lug 22.

23 denotes a slide adapted to move upon plate 21. In the present instance I have shown the slide as inclosing the edges of the plate, which form ways upon which the slide moves. Upon the under side of the slide is a lug 24 and a hand-screw 25, which passes through lug 24 and engages lug 22. In use the slide is forced against the sectional band by means of this screw, as clearly shown in Fig. 10, thereby clamping the band and the straps tightly together and locking the rest in place. The felly of the wheel and the tire are both supported by the slide, as clearly shown in Fig. 16. Any number of these rests may be used, and they may be placed intermediate the ends of the sections of the band or may be placed, as in Figs. 1 and 9, at the point of engagement of two sections to hold the ends of both sections in place.

Where a rest is used at the point of engagement of two sections, the slide is not moved up very tightly and will not interfere with the endwise movement of the sections, while at the same time it will retain their ends in place. In addition to the rests D, I have in the present instance shown a fixed rest 26 upon the first section of the band. I have also (see Fig. 8) shown upon the first section of the band one rest D, permanently attached thereto. This special rest, which, for convenience, I will designate by D', is provided on its inner face with a plate 27, which is shown as riveted to the first section and as secured to the rest by a screw 28, engaging the head 19. The rest D' is additionally secured to the first section by means of lugs 29 on the section, which engage the sides of the rest. In the present instance I have shown lugs 29 as formed upon a plate 30, which is riveted to the first section and the end 30ª of which extends beyond the end of the section, so as to bear against the inner face of the contiguous section and hold it in place. This construction permits the rest to be readily placed in position or removed, if necessary, as will be readily understood from Fig. 8, in which, however, the end of the contiguous section is not shown, as the engagement of the ends of the sections is clearly shown in Fig. 9.

31 (see Fig. 11) denotes springs, the action of which is to separate the permanent sections of the band as soon as pressure thereon is relieved, it being understood, of course, that the pressure exerted in setting a tire, which moves the sections of the band endwise toward each other, is against the tension of these springs, and that as soon as the pressure is relieved these springs will act to separate the sections again, so that the wheel may be readily removed. One end of each spring is riveted to a section of the band, as clearly shown in Fig. 11, the other end bearing against the body of one of the clips. It will be noted in Figs. 1 and 11 that the sections of the band are provided at each end with a spring bearing against the body of one of the clips. At the end of the first section of the band, opposite to clip D', and at the end of the contiguous sections I place springs, which bear against each other instead of against the body of a clip, as at 31ᵃ in Fig. 3. It will be noted in Figs. 1 and 3 that the first section of the band is longer than the other sections. In order to insure that this section will be moved endwise the instant pressure upon the tire is relieved, I provide this section with additional springs 31, which are riveted to lugs 32 at the sides of the section and which bear against blocks 33, bolted to the upper and lower plates of the frame. (See Figs. 8 and 14.) These blocks are provided with flanges 33ᵃ, which overhang the straps and the section of the band and retain them securely in place, the section of the band, however, being free to slide under the flanges.

The edges of the outer sides of the straps, the band, and the tire and wheel that are being operated upon are supported by an extension-leg E. This leg consists of a horizontal piece 34, the inner end of which engages an eye 35, swiveled under the frame. The horizontal piece is provided at its midlength with a slot 36 and between said slot and the outer end with a hinge-joint 37, which permits the outer end of the leg to be oscillated in the horizontal plane when necessary to place it either side of the outer rest. It will be noted in Fig. 16 that the straps and band rest upon the extension-leg, the outer rest lying at one side of the leg.

38 denotes a support for the horizontal piece, which rests upon the floor and the upper end of which is secured to the horizontal piece, in the present instance by a handle 39, which passes through the support and engages the horizontal piece, the handle forming a convenient means for manipulating the leg when necessary.

F (see Fig. 3) denotes an inside forming-plate which rests upon the lower plate of the frame and is adapted to bear against the inner face of the first section of the band below the plane of the slides 23—that is, below the plane of the wheel and tire when the machine is in use.

40 denotes a threaded rod which passes through a hole (see dotted lines, Fig. 13) in the lower plate 2 of the frame and the head 41 of which (see dotted lines, Fig. 3) is pivoted to the under side of the forming-plate and lies in a recess 42 in plate 2. (See Fig. 13.)

43 denotes a sleeve on the outer end of rod 40, which bears against the outer face of the lower plate of the frame, and 44 a hand-nut which bears against the sleeve; and the action of which is to draw the forming-plate against the inner face of the first section of the band. This inside forming-plate is one of the important features of the machine, in that it forms a convenient means for taking any "set" out of the first section of the band. For example, in changing the adjustment of the machine from a small to a relatively large sized wheel I am enabled to spring the ends of the first section back, so as to give to the first section the required curvature to cause it to fit the larger-sized tire accurately.

45 (see Fig. 3) denotes a notch or recess in the inside forming-plate, which receives the lower portion of the fixed rest 26 on the first section of the band.

G (see Figs. 2, 2ᵃ, and 3) denotes an outside forming-plate, the object of which is to force the outside plies or layers of the straps at the point where the curved portion of the outer plies or layers of the straps run into the straight portion thereof inward against the inner plies or layers of the straps, thereby forming a backing for the straps at the place where the separate beveled ends of said straps intersect with the main portions thereof and imparting to this portion of the straps the curvature of the tire that is to be acted upon. Another important function of the outside forming-plate is that it wholly prevents bowing or concaving of the straps at this point no matter how great the pressure may be in setting a tire.

46 denotes the bearing-plate, which is caused to press against the outer face of the outer strap.

47 denotes a plate bolted to one end of plate 46 and provided on its outer face with an incline or inclines 48 and on its edges with lugs 49. The inclines are adapted to engage one of the webs 3 of the frame, (see Fig. 3 in connection with Fig. 13,) and the lugs lie in recesses 50 in the upper and lower plates of the frame and at their extreme of movement engage shoulders 51. The recess 50 and shoulder 51 of the lower plate 2 of the frame are clearly shown in Fig. 13, the incline and lug appearing in dotted lines. The other end of the outside forming-plate is adapted to be forced against the straps by means of arms 52, which carry at one end a nut 53, the other ends of said arms being pivoted to a lug or lugs 54 upon plate 46. (See Fig. 2ᵃ in connection with Figs. 2 and 3.)

55 denotes a hand-screw which engages the nut, the ends of said screw being unthreaded and turning freely in two of the webs 3 of the frame. One end of the hand-screw is provided with a head 56, which bears against the outer face of one of the webs, the other end being provided with a handpiece 57 for convenience in operation. It will be seen that rotation of the hand-screw in one direction will force the inclines backward over the web 3, which they engage, thereby relieving the inward pressure of one end of the outside forming-plate upon the straps, and will simultaneously move the other end of said forming-plate outward, thereby relieving the inward pressure of that end of the forming-plate upon the straps, and that rotation of the hand-screw in the opposite direction will draw the inclines forward over the web which they engage, and thus force that end of the outside forming-plate inward against the straps, and will simultaneously, by means of the arms 52 engaging lugs 54, force inward the opposite end of said forming-plate, thereby causing the straps and the sectional band to conform accurately to the curvature of the tire that is to be acted upon.

The compressive action of the straps upon the band and tire is produced by means of a toggle H, one end of which is connected to the frame and the other to a sliding carriage I. This toggle consists, essentially, of upper and lower blocks 58 and 59, which are engaged by a right and left threaded screw 60, and links 61, the ends of which are pivoted to blocks 58 and 59, respectively, and to blocks 62 and 63, which are bolted, respectively, to the frame and to the sliding carriage. It will be readily understood from Figs. 2 and 3 that when the screw is rotated, the blocks 58 and 59 being engaged, respectively, by the right and left threads of the screw, said blocks will be moved toward or from each other and will act, by means of the links, to force the sliding carriage outward in compressing a tire upon a wheel or to draw the carriage inward when it is desired to relieve the pressure upon a tire. The sliding carriage is provided with grooves 64, which engage ways 65 upon the upper and lower plates of the frame. (See Figs. 1, 2, and 3.) The straps pass through a tapering opening 66 in the carriage, in which they are locked by means of inner and outer wedges 67 and 68. The shape of the inner wedge will be clearly understood from Fig. 3ᵃ. This wedge in the direction of its length presents a convex curve on one face, as at 72, and a straight taper on the other face and is provided with shoulders 69, which are adapted to engage the outer face of the carriage at the top and bottom of opening 66 to limit the inward movement of the wedge, and with lugs 70, which engage the tops of the straps. (See Fig. 3.) These lugs act as guides to hold the wedge level and prevent it from dropping down when the straps are loose. I also provide wedge 67 with handles 71 for convenience in inserting and removing it. The shape of outer wedge 68 will be readily understood from Fig. 3. This wedge presents a concave curve on its inner face, as at 73, to correspond with the convex curve upon the corresponding face of the inner wedge. These curves of the wedges act in use to bend the two outer straps slightly and give an absolutely rigid hold of the wedges upon the straps.

74 denotes ears upon the outer wedge, between which is pivoted an oscillatory block 75.

J denotes a yoke which is pivoted to the sliding carriage, and K a frame extending outward from one side of the yoke and rigidly secured thereto. The straps (see Fig. 3) pass between rollers 76 and 77, roller 76 being journaled in the frame and roller 77 journaled in a slide 78, which is adapted to move on ways 79 on the frame. The slide is controlled by a hand-screw 80, which engages the head 81 of the frame and the inner end of which is pivoted to turn freely in the slide, as at 82. The shafts of these rollers extend upward through the frame, the shaft of roller 77 passing through a slot 83 in the frame, and carry pinions 84, which are adapted to mesh when the slide is moved inward to clamp the straps, as in Fig. 15. The shafts of both rollers are provided with squared ends 85 to adapt them to receive a crank 86, which may be applied to either shaft. The outer wedge is moved in and out by means of a screw 87. This screw passes through a threaded opening in pivoted block 75, and the inner end thereof bears against a projection 88 upon the sliding carriage. This screw is also provided with a squared portion 89 for engagement by a wrench, as will be more fully explained, with a rounded boss 90, which engages a correspondingly-shaped socket in the inner face of the head 91 of the yoke, the opening 92 in the head of the yoke, through which the shank of the screw passes, tapering toward the outer face of the yoke, so as to permit any movement of the screw that may be required in shifting the position of the yoke and the wedge, it being apparent from Fig. 3 that the screw is self-adjusting, pivoted block 75, through which the threaded portion of the screw passes, the rounded boss, engaging the socket, and the tapering opening 92, through which the shank passes, all coacting in retaining the screw securely in position and at the same time permitting ample movement of both yoke and wedge, the projection against which the screw bears being made large enough to present a bearing-surface for the end of the screw under all circumstances. At the outer end of the shank of the screw I provide a handpiece 93 for convenience in operation.

The screw 60 of toggle H is journaled on a sliding frame L. This frame is shown as supported by a bolt 94, passing through a slot 95 in the sliding frame and engaging the web 3 of frame A, against which the toggle bears, and an arm 96, which is bolted to the frame and rests upon a bracket 97, extending outward from the sliding carriage. The screw 60 carries at its lower end a gear-wheel 98, which meshes with a pinion 99 on a shaft 100, also journaled on the sliding frame.

101 denotes a pinion, 102 a bevel-gear, and 103 a clutch member, which are either formed in a single piece or rigidly secured together and are mounted and adapted to turn on the shank 60ᵃ of screw 60 above the sliding frame.

104 denotes a gear-wheel mounted and adapted to turn on shaft 100 and meshing with pinion 101 on the shank of screw 60, and 105 denotes a clutch member formed upon the upper face of gear-wheel 104. The upper ends of shank 60ᵃ and shaft 100 are squared, as at 106, to adapt them to receive a crank—for example, crank 86—should it be desired to operate the machine by hand. The squared portion of shank 60ᵃ carries a sliding clutch member 107, which is adapted to engage clutch member 103, and the squared portion of shaft 100 carries a sliding clutch member 108, which is adapted to engage clutch member 105. Clutch members 107 and 108 are provided with grooves and are engaged, respectively, by yokes 109 and 110, pivoted to a clutch-lever 111, which is itself pivoted to an arm 112, rigidly secured to a bracket 113, which is formed integral with or rigidly secured to the sliding frame.

114 denotes an arm extending from the sliding frame and provided with notches adapted to be engaged by a spring-latch 115 on the clutch-lever, whereby either pair of clutch members is locked in engagement or both pairs are locked out of engagement, as in Fig. 2, a trip 116 being provided (see Fig. 2ᵇ) to disengage the latch from either of the notches. In Figs. 2 and 2ᵇ I have shown the latch as in engagement with the intermediate notch, which leaves both of the clutch members 107 and 108 out of engagement with the corresponding clutch members. The toggle is operated by means of a belt (not shown) passing over a belt-pulley 117 on a shaft 118, which is journaled in bracket 113. Shaft 118 also carries a bevel-pinion 119, which meshes with the bevel-gear 102, mounted and adapted to turn on the shank of screw 60.

The object of the special construction just described is to enable me to give to the toggle a relatively fast speed and a slow speed, the relatively slow speed being used in setting tires upon wheels and the fast speed in the backward movement—that is, in releasing the pressure of the straps upon a tire. It will be readily understood from Fig. 2 and the description given that when the parts are in the position illustrated in Fig. 2—that is, with clutch members 107 and 108 both out of engagement with the corresponding clutch members—the rotation of shaft 118 will be communicated by bevel-pinion 119 to bevel-gear 102 and pinion 101, which turn on the shank of the toggle-screw, and that pinion 101 will communicate motion to gear-wheel 104, which turns on shaft 100, but that shank 60ᵃ and shaft 100 will both remain stationary. When slow speed of the toggle is desired, as in setting a tire, the operator by means of clutch-lever 111 places clutch member 108 in engagement with clutch member 105, thereby communicating motion to shaft 100 and by means of pinion 99 and gear-wheel 98 to the toggle-screw. When the relatively fast speed is desired, as when releasing the pressure of the straps upon a tire, the operator places clutch member 107 in engagement with clutch member 103, thereby communicating motion directly to the toggle-screw, both shaft 100 and gear-wheel 104 now running idle. The outer end of shaft 118 is squared, as at 106, to receive a crank—for example, crank 86. Should it be required at any time to move the parts without the application of power, or even to set tires without power, the operator is enabled to do so by applying the crank to the squared end of shaft 118, the proper clutch being manipulated to give the desired speed the same as when the machine is driven by power, or, if preferred, the machine may be operated by applying the crank to the squared ends of either shaft 100 or the shank 60ᵃ of the toggle-screw, as already stated.

120 (see Fig. 4 in connection with Fig. 1) denotes a holding-plate, which in use is turned down upon the hub of the wheel to be operated upon. This plate is shown as secured to a carrier 121 by means of a ball-and-socket joint 122. The carrier is socketed in a head 123 and is held against rotation therein by means of a rib 124, which engages a corresponding groove in the head. The carrier and the holding-plate are raised and lowered by means of a hand-screw 125, which engages a threaded opening in the carrier and is held against vertical movement in the head, as clearly shown in Fig. 4. The head is secured to a horizontal rod 126 by means of a sleeve 127, which extends outward from a bracket 128. The end of rod 126 passes through the sleeve and the bracket and carries a cross-pin 129, (see Fig. 4ᵃ,) which is adapted to engage slots 130 in the bracket. The sleeve may be oscillated on the rod to carry the holding-plate out of its operative position, as shown by dotted lines in Fig. 1, as when placing a wheel in the machine or removing it.

131 denotes a spring partly socketed in sleeve 127 and bearing against a collar 132 on the rod. The action of this spring is to hold the cross-pin in engagement with one of the slots 130, as may be required to retain the holding-plate either in or out of its operative position. Rod 126 is adjustable in a sleeve 133, pivoted, as at 134, to an arm 135, itself pivoted, as at 136, to a plate 137, having legs or webs which rest upon the frame and which are secured to the frame by a bolt 138, the head of which is countersunk in the plate, as clearly shown in Fig. 5.

It will be noted that by making horizontal rod 126 adjustable in sleeve 133 and pivoting the latter to arm 135 I am enabled to place the holding-plate in position to engage the hub of any wheel the machine may be required to operate upon, whether large or small.

139 denotes a housing on plate 137, which is provided with a slot 140, through which arm 135 passes, and with a recess 141. A hand-screw 142 passes down through the housing, and the end thereof bears upon arm 135. The pressure upon the lever is regulated by a tension-spring 143, one end of which bears against the cap-plate of the housing and the other against a nut 144. This nut is provided with a rib 145, which engages a corresponding groove in the housing and holds the nut against rotation, so that rotation of the hand-screw will raise or lower the nut thereon and either increase or decrease the tension of the spring, and consequently the pressure of the hand-screw upon arm 135.

146 denotes a tripping-lever adapted to be operated upon by holding-plate 120, arm 135, and the intermediate connections, and 147 denotes a tripping-lever adapted to be operated upon by the toggle. These tripping-levers are fulcrumed between ears 148 on plate 137, the portions of said tripping-levers forward of their fulcrums lying in slots in the plate and flush with the surface thereof, as will be understood from Figs. 5 and 6, the extreme forward ends of said tripping-levers 146 and 147 lying on the under side of plate 137 and engaging, respectively, hand tripping-levers 149 and 150. The inner ends of these hand tripping-levers lie in a slot 151 in plate 137, each lever being provided with an incline terminating in an angular shoulder 152, lying above the surface of the plate, and both levers being shown as fulcrumed on a screw-pin 153, extending inward from the front. These hand tripping-levers extend outward in opposite directions under plate 137, are provided at their ends with handpieces 154 for convenience in operation, and are retained in operative position by a spring or springs 137$^a$.

155 denotes a starting-lever which is secured to a shifting-rod 156, which is stepped in plate 137 and extends upward to the ceiling or to any suitable fixture (not shown) in which it may have a bearing. The starting-lever has extending from its opposite sides curved rods 157. 158 denotes springs retained in position by these rods, the ends of which bear, respectively, against the opposite sides of the starting-lever and against the bottoms of curved sockets 159, the outer ends of the sockets serving as stops to limit the movement of the starting-lever in either direction.

The operation of the starting-lever will be clearly understood from Fig. 7 in connection with Fig. 5. When this lever is swung in either direction, it engages one of the inclines, presses down the hand tripping-lever against the power of spring 137$^a$, and is then engaged and locked by the angular shoulder 152 upon the hand tripping-lever—as, for example, by the angular shoulder of hand tripping-lever 149, as indicated by dotted lines in Fig. 7. The rear end of tripping-lever 146 carries a set-screw 160, which is adapted to be engaged by arm 135 when the latter is tilted, thereby tilting the rear end of tripping-lever 146, which bears upon hand tripping-lever 149, depressing the latter, and consequently depressing the angular shoulder 152 on said lever, so that the starting-lever will be disengaged from said shoulder and will be carried by the spring 158 upon that side to its normal position, in which it is retained by the opposing pressure of the two springs. Tripping-lever 147 is curved upward and extends backward and carries at its rear end a set-screw 161, which is adapted to be engaged by a lug 162, which extends upward and outward from upper toggle-block 58, thereby tilting the rear end of tripping-lever 147, which bears upon hand tripping-lever 150, depressing the latter, and consequently depressing the angular shoulder 152 on said lever, so that the starting-lever will be disengaged from said shoulder and will be carried by the spring 158 upon that side to its normal position, in which it is retained by the opposing pressure of the two springs. (See Fig. 5 in connection with Figs. 1 and 2.)

As already stated, power is applied to drive the machine by a belt (not shown) running over belt-pulley 117. Suitable shifting mechanism which is not shown, as specifically it forms no portion of my present invention, is operated by the oscillation of shifting-rod 156 to reverse the movement of the belt. It is sufficient for the purposes of this specification to say that when the starting-lever is at its central position, as in Figs. 5 and 7, belt-pulley 117 is not in operation. When the starting-lever is swung to the extreme of its movement toward the left and locked there by engagement with the angular shoulder 152, as indicated by dotted lines in Fig. 7, movement is imparted to belt-pulley 117, and upon connecting either pair of clutch members toggle-blocks 58 and 59 will be moved toward each other to tighten the straps, as in setting a tire, and when the starting-lever is swung to the extreme of its movement in the opposite direction and locked there by engagement with the other angular shoulder 152 movement will be imparted to belt-pulley 117 in the opposite direction, and upon connecting either pair of clutch members the toggle-blocks will be moved away from each other to loosen the straps and relieve the pressure upon the tire.

It will be understood from Figs. 1 and 4 that after a wheel has been placed in position to be operated upon holding-plate 120 will be held firmly in contact with the hub by tension-spring 143 and that the amount of dish to be given to the wheel is determined by the adjustment of the set-screw 160 in tripping-lever 146.

It will of course be understood that all wagon-wheels have more or less dish. The convex side of the wheel is placed uppermost, and as soon as pressure is applied to set the tire the hub will be forced upward, thus giving greater dish to the wheel. An instant after arm 135 has been lifted into position to engage set-screw 160 in tripping-lever 146 the tilting of said lever will tilt the corresponding hand tripping-lever 149 downward and will release the starting-lever, throwing the latter to its intermediate position, as in Fig. 5, and stopping the operation of the toggle mechanism. Should great pressure be required upon a wheel in order to set a tire firmly thereon while imparting but little dish to the wheel, this result is accomplished by increasing the tension of spring 143, thereby increasing the pressure of hand-screw 142 upon arm 135, so that the holding-plate will retain the hub downward until the required compression has been given to the tire, and also turning down set-screw 160 in tripping-lever 146. When it is desired to remove a wheel, the starting-lever is swung toward the right, as seen in Fig. 7, and is placed in engagement with the right-angular shoulder 152. This movement through oscillation of shifting-rod 156 will cause belt-pulley 117 to be rotated in the opposite direction and will consequently move toggle-blocks 58 and 59 away from each other and relieve the pressure of the straps upon the wheel. As soon as the straps are loosened sufficiently, which is determined by the adjustment of set-screw 161 in tripping-lever 147, this tripping-lever is tilted by the engagement of lug 162 with set-screw 161 and in turn trips hand tripping-lever 150, thereby releasing the starting-lever, which is thrown by the spring back to its normal position, oscillating the shifting-rod and again stopping the movement of the toggle mechanism.

It will of course be apparent that the hand tripping-levers may be operated at any time should it be required to stop the machine or be preferred for any reason not to use the automatic tripping mechanism.

In Figs. 16, 16ª, and 17 I have shown a hand device for regulating the dish of the wheels, which may be used at any time in lieu of the automatic mechanism just described either when the machine is being run by power or by hand. The horizontal piece 34 of extension-leg E is provided with a slot 36, as already stated. 164 denotes a screw the head 165 of which will pass freely through this slot. 166 denotes a plate having an opening 167, through which head 165 will pass freely, and a slot 168, leading therefrom, which will just receive the shank of the screw, but not the head, so that the screw will be locked to the extension-leg by the plate, as clearly indicated in Fig. 16ª. 169 is a hand-nut adapted to engage the upper end of the screw. In use after the wheel has been placed in position the screw is passed up through slot 36 and through the hub of the wheel, plate 166 is placed in position, as in Fig. 16ª, and the hand-nut is screwed down as far as may be required to give the required dish to the wheel. It will of course be apparent that the nut will rest upon the hub and that plate 166 will drop down below the extension-leg, as in Fig. 16. As the straps are tightened about the tire the hub will be lifted and will move upward until the plate is in engagement with the extension-leg. While the parts are in this position, the required amount of pressure may be imparted to set the tire without increasing the dish of the wheel.

The operation of the machine as a whole is briefly as follows: Figs. 1, 2, and 3 illustrate practically the act of setting a tire, the wheel appearing in dotted lines in Fig. 1 and the sectional band being closely in contact therewith, although in Fig. 2 both pairs of clutch members are shown out of engagement. So far as these views are concerned the parts may be assumed to be in position to commence the act of setting a tire or the setting of a tire may have been completed or the toggle mechanism may have been stopped during the setting of a tire. Supposing the parts to be in this position and that it is desired to set a tire upon another wheel of the same size, the operator swings starting-lever 155 toward the right, as seen in Figs. 5 and 7, which oscillates shifting-rod 156 and transmits power to shaft 118 and to pinion 101 on the shank of the toggle-screw, the parts being locked in this position by the engagement of the starting-lever with the corresponding shoulder 152. The operator then by means of clutch-lever 111 places one pair of clutch members—for example, the pair of clutch members producing the fast speed—in engagement, thereby transmitting power to the toggle-operating mechanism, the action being to move toggle-blocks 58 and 59 away from each other, and thus draw the sliding carriage inward, which relieves the pressure of the straps and band upon the tire, springs 31 acting to force the sections of the band apart as the pressure is relieved. As soon as the straps and band have been loosened sufficiently to permit the wheel to be removed and another wheel and tire to be placed in position to be operated upon lug 162 upon the upper toggle-block will act to tilt tripping-lever 147 and release the starting-lever, again oscillating shifting-rod 156, disengaging the clutch members, and stopping the action of the toggle mechanism. As soon as the new wheel and tire have been placed in position the operator swings starting-lever 155 toward the left, as seen in Figs. 5 and 7, locks it there by engagement with the corresponding shoulder 152, and by means of clutch-lever 111 places the pair of clutch members producing the slow speed in engagement, the action now being to move toggle-blocks 58 and 59 toward each other, thus moving the sliding carriage outward and exerting the full power of the machine upon the tire to compress and set it upon the wheel. This action will continue, the hub of the wheel rising as the power is applied until the required dish has been given to the wheel, at which instant arm 135 will have been raised sufficiently to engage the set-screw in tripping-lever 146, tilting said lever and again releasing the starting-lever and oscillating shifting-rod 156, which will stop the action of the toggle mechanism. The operator then swings the starting-lever toward the right again, which causes the sliding carriage to be moved inward and relieves the pressure of the straps and band upon the wheel, these operations being repeated indefinitely. Suppose now that it is desired to set a tire upon a wheel varying considerably in size from the one that has been operated upon, either larger or smaller. The operator moves the sliding carriage inward as before to relieve the pressure of the straps and band upon the wheel. It is then required to remove the inner and outer wedges. The operator first by means of a wrench applied to squared portion 89 of screw 87 starts said screw and loosens the outer wedge, which after the screw has been started may be drawn back quickly by means of handpiece 93. Having loosened the outer wedge, the operator then withdraws the inner wedge and closes roller 77 upon the straps by means of hand-screw 80. The straps being now clamped firmly between the rollers may be readily moved inward or outward, as may be required to enlarge or diminish the circle of the straps and band, by applying crank 86 to either of the squared ends 85 and rotating the rollers. The wheel and tire to be operated upon are then placed within the circle of the sectional band. If the change is from a small wheel to a larger one, the inside forming-plate is now operated by means of hand-nut 44 to take out the set from the first section of the band and to impart to said section the required curvature to cause it to fit the larger-sized tire accurately. The outside forming-plate is also operated by means of hand-screw 55 to form a backing for the straps and to cause the portion of the straps which it acts upon to assume the required curvature. If the change is made from a large wheel to a smaller one, the outside forming-plate shapes the portion of the straps where they overlap to the smaller circle, its action being to even or round out the circle, so that the sections of the band will press evenly upon the tire and to prevent the straps from concaving when great pressure is applied in setting the tire. In adjusting the sectional band to the new wheel the operator while it is loose removes one of the short sections, loosening, of course, the rests which engage the ends of that section and moving them slightly to one side, then closes up the straps and band upon the tire by means of rollers 76 and 77, and then determines the short section or sections that are required to complete the circle, leaving half an inch (more or less) space between the sections when closed upon the tire, but before power has been applied to set the tire. Having selected the section or sections of the band required to complete the circle, it being understood, of course, that all except a few of the short sections of the band remain permanently in place, the operator loosens the straps and band again by means of rollers 76 and 77 and fixes the required section or sections of the band in place. The wheel-rests which engage the short sections of the band, as in Fig. 9, are then adjusted to proper place. In order to save time, the operator first draws the straps and band as tightly about the tire as possible by means of rollers 76 and 77. He then moves roller 77 outward, as in Fig. 3, by means of hand-screw 80 in order that he may apply the wedges. The inner wedge is placed between the second and third straps, the lugs 70 resting upon the straps and the shoulders 69 left back slightly (from a quarter to a half inch) from the front of opening 66 in the sliding carriage. The operator then by means of hand-screw 93 sets up the outside wedge quickly and afterward preferably applies a wrench to squared portion 89 in order to set it up as tightly as possible. When power is applied by means of the toggle to set the tire, the inner wedge may move inward slightly until the shoulders are in engagement with the front of the sliding carriage. The action of these wedges is to lock the bands absolutely rigidly to the sliding carriage.

Having thus described my invention, I claim—

1. In a machine of the character described the combination with a frame, a series of straps coiled upon themselves and connected to the frame, and a sectional band lying within the straps, of a sliding carriage, means for detachably securing the outer ends of the straps to said carriage, a toggle comprising upper and lower blocks, links pivoted respectively to said blocks and to the frame and carriage and a screw, a sliding frame on which the screw is journaled and operating mechanism carried by the sliding frame whereby the toggle-blocks are moved toward or from each other to tighten or loosen the straps and band.

2. The combination with the frame and sliding carriage, of a sliding frame, a toggle whose screw is journaled on said frame and mechanism also carried by said frame for producing fast and slow speeds of the screw.

3. The combination with the frame, sliding carriage and toggle, of a sliding frame on which the toggle-screw is journaled, a shaft 100 also journaled on said frame, a gear-wheel 98 carried by the screw, a pinion 99 meshing therewith carried by the shaft, a pinion 101 mounted to turn on the shank of the screw, a gear-wheel meshing therewith mounted to turn on the shaft, means for imparting rotation to pinion 101 and clutches acting respectively to connect pinion 101 with the shank of the screw or gear-wheel 104 with the shaft so that the toggle may be operated with either a fast or slow speed.

4. The combination with the frame, a series of straps coiled upon themselves and connected to the frame and a sectional band lying within the straps, of a sliding carriage to which the straps are detachably secured, a sliding frame, a toggle for moving the carriage in or out to tighten or loosen the straps and band, mechanism carried by the sliding frame for operating the toggle and means for stopping the toggle-operating mechanism when the required dish has been imparted to a wheel in setting a tire.

5. The combination with the straps, the toggle and operating mechanism therefor, of shifting-rod 156, holding-plate 120 which is adapted to bear upon the hub of a wheel that is being operated upon and mechanism intermediate the holding-plate and the shifting-rod whereby after said rod has been oscillated to start the toggle-operating mechanism in setting a tire it is automatically released and returned to its normal position by the raising of plate 120 the instant the predetermined dish has been given to the wheel.

6. The combination with the straps, the toggle and operating mechanism therefor, of shifting-rod 156 and mechanism intermediate the toggle and the shifting-rod whereby after said rod has been oscillated to start the toggle-operating mechanism in relieving the pressure of the straps it is automatically released and returned to its normal position by movement of the toggle the instant the straps have been loosened to a predetermined degree.

7. The combination with the straps, the toggle and operating mechanism therefor, of shifting-rod 156, a starting-lever by which said rod is oscillated in either direction, holding-plate 120 which is adapted to bear upon the hub of a wheel that is being operated upon, means for locking the starting-lever at either extreme of its movement and for returning it to its normal position and mechanism intermediate the holding-plate and the starting-lever whereby said lever is automatically released and the toggle-operating mechanism stopped when the predetermined dish has been given to the wheel or when the pressure of the straps has been relieved to the predetermined degree.

8. The combination with the straps, the toggle, and operating mechanism therefor, of shifting-rod 156, a starting-lever by which said rod is oscillated, holding-plate 120 which is adapted to bear upon the hub of a wheel that is being operated upon, means for locking the starting-lever at the operative position and for returning it to its normal position and mechanism intermediate the holding-plate and the starting-lever whereby said lever is automatically released and the toggle-operating mechanism stopped the instant the predetermined dish has been given to the wheel.

9. The combination with tire-setting mechanism, a toggle and operating mechanism therefor by which the tire-setting mechanism is actuated to compress or release a tire and mechanism operated by the contraction of the toggle to automatically stop the toggle-operating mechanism when the pressure of the tire-setting mechanism has been relieved to the predetermined degree.

10. The combination with the toggle, operating mechanism therefor, shifting-rod 156, a starting-lever by which said rod is oscillated in either direction, springs for retaining the starting-lever at its normal position, and hand tripping-levers provided with shoulders adapted to be engaged by the starting-lever to lock it at either extreme of its movement, of tripping-levers adapted to act respectively on the hand tripping-levers to release the starting-lever, lug 162 adapted to engage one of said levers when the toggle is contracted and a holding-plate 120 and mechanism intermediate said plate and the other tripping-lever which is actuated by the rise of the hub of the wheel that is being acted upon whereby the operation of the toggle-operating mechanism in expanding or contracting the toggle is stopped automatically.

11. The combination with the toggle, operating mechanism therefor, the shifting-rod 156, a starting-lever by which said rod is oscillated, a spring for returning said lever to its normal position and a hand tripping-lever 150 having a shoulder adapted to be engaged by the starting-lever to lock the latter at one extreme of its movement, of a tripping-lever 147 adapted to act upon the hand tripping-lever and a lug 162 upon the toggle adapted to engage the tripping-lever when the toggle is contracted whereby the operation of the toggle-operating mechanism is stopped automatically.

12. The combination with the toggle, operating mechanism therefor, shifting-rod 156, a starting-lever by which said rod is oscillated, a spring for returning said lever to its normal position, and a hand tripping-lever 149 having a shoulder adapted to be engaged by the starting-lever to lock the latter at one extreme of its movement, of a tripping-lever 146 adapted to act upon the hand tripping-lever, a holding-plate 120 and mechanism intermediate said plate and the tripping-lever which is actuated by the rise of the hub of a wheel that is being acted upon whereby the toggle-operating mechanism is stopped automatically.

13. The combination with shifting-rod 156, a starting-lever by which said rod is oscillated, a spring for returning said lever to its normal position and a hand tripping-lever 149 having a shoulder adapted to be engaged by the starting-lever to lock the latter at one extreme of its movement, of a tripping-lever 146 adapted to act upon the hand tripping-lever, a pivoted arm 135 adapted to engage the tripping-lever and carrying an adjustable rod 126, a head 123 carried by said rod and a vertically-adjustable holding-plate carried by the head which is adapted to engage the hub of the wheel that is being operated upon so that when the hub is raised the tripping-lever will be tilted and will in turn tilt the hand tripping-lever which will release the starting-lever and stop the mechanism controlled thereby.

14. The combination with arm 135, sleeve 133 pivoted thereto, and rod 126 adjustably secured in said sleeve, of head 123 adapted to be oscillated on said rod, an adjustable holding-plate carried by the head and means for retaining the head and holding-plate either in or out of operative position.

15. The combination with arm 135, sleeve 133 pivoted thereto and a rod 126 adjustably secured in said sleeve, of a head 123 adapted to be oscillated on said rod, holding-plate 120 and a carrier to which the holding-plate is pivotally secured and means as a hand-screw for adjusting the carrier and the holding-plate in the head.

16. The combination with arm 135, sleeve 133 pivoted thereto and a rod 126 adjustably secured in said sleeve, of holding-plate 120, head 123 to which the holding-plate is pivotally secured, a sleeve 127 extending from said head, through which the rod passes and which is provided with cross-grooves 130, a cross-pin at the end of the rod and a spring acting to hold the cross-pin in engagement with either of the cross-grooves to retain the head and holding-plate either in or out of operative position.

17. The combination with arm 135, head 123 adjustably secured thereto and the holding-plate adjustably secured to the head, of hand-screw 142 adapted to bear upon arm 135 and a tension-spring the action of which is to regulate the pressure of the screw upon the arm.

18. The combination with arm 135, rod 126, head 123 and the holding-plate adjustably secured to said head, of hand-screw 142 adapted to bear upon arm 135, a nut on said screw which is held against rotation and is adjustable by rotation of the screw and a tension-spring bearing against said nut.

19. The combination with a frame, a series of straps coiled upon themselves and connected to the frame and a sectional band lying within the straps, of a sliding carriage to which the straps are detachably secured, a toggle for moving the carriage in or out to tighten or loosen the straps and band and means for automatically stopping the action of the toggle when the required dish has been imparted to a wheel in setting a tire.

20. The combination with arm 135, a housing 139 through which said arm passes, head 123 adjustably secured to said arm and a holding-plate adjustably secured to the head, of hand-screw 142 carried by the housing and bearing upon arm 135, a nut on said screw held against rotation by the housing and a spring resting against said nut and the housing so that rotation of the screw will regulate the pressure of the screw upon the arm.

21. The combination with the frame, the straps and the toggle and operating mechanism therefor, of the sliding carriage and the sliding frame by which the toggle and its operating mechanism are carried.

22. The combination with the frame, and the straps, of the sliding carriage having an opening through which the straps pass, a yoke pivoted to the carriage and a frame upon the yoke carrying rollers by which the straps may be tightened or loosened.

23. The combination with the frame, the straps connected to the frame, the carriage and the yoke pivoted thereto, of a frame carried by the yoke, a roller 76 and a slide in said frame carrying a roller 77 so that when said slide is moved inward to clamp the straps between the rollers rotation of said rollers will tighten or loosen the straps.

24. The combination with the frame, the straps connected to the frame, the carriage and the yoke pivoted thereto, of a frame carried by the yoke, a roller 76, a slide in said frame carrying a roller 77, screw 80 by which the slide may be moved inward, and pinions on the roller-shafts which engage when roller 77 is in operative position.

25. The combination with the straps and the carriage having an opening through which the straps pass, of a yoke pivoted to the carriage, a wedge having lugs 70, a block pivoted between said lugs and having a threaded opening, and a screw carried by the yoke which passes through the opening in the block and bears against the carriage.

26. The combination with the straps and the carriage having an opening through which the straps pass, of a yoke pivoted to the carriage and having a rounded socket and a tapering opening 92, a wedge 68 carrying a pivoted block having a threaded opening through it and a screw which passes through the opening in the block, bears against the carriage and is provided with a rounded boss 90 which engages the correspondingly-shaped socket in the yoke.

27. The combination with the straps and the carriage having an opening through which the straps pass, of a yoke pivoted to the carriage, a wedge 67 having a straight taper on one side and a convex curve on the other which is adapted to lie between the straps, a wedge 68 having a concave curve adapted to engage the outer strap and mechanism carried by the yoke for operating wedge 68.

28. The combination with the frame, the straps secured thereto and the toggle, of the sliding carriage having an opening through which the straps pass, and wedges 67 and 68 having respectively convex and concave faces by which the straps are locked in the sliding carriage.

29. The wedge 67 having shoulders 69 and lugs 70, the outer face of said wedge being a convex curve.

30. The combination with the straps and the carriage having an opening through which the straps pass, of a yoke pivoted to the carriage, a wedge 67 which is convex upon one side, is adapted to lie between straps and is provided with shoulders 69 adapted to engage the outer face of the carriage and a wedge 68 having a concave curve which engages the outer strap in the opening in the carriage.

31. The combination with plates 1 and 2 having grooves 10 and steel blocks cast into said plates at the ends of the grooves, of the straps having lugs 9 adapted to engage said blocks, the sliding carriage to which the straps are detachably secured and the toggle adapted to act upon the sliding carriage.

32. The combination with the frame having a swiveled eye, the straps, the sectional band, the sliding frame and the toggle of an extension-leg to support the outer edge of the straps, band and wheel that is to be operated upon, said leg comprising a horizontal piece engaging the swiveled eye and provided with a hinged joint to permit movement of the outer end in the horizontal plane and a support engaging the outer end of the horizontal piece and resting upon the floor.

33. The combination with the outer strap, the frame having a web 3 and lugs 17 upon the web, of a brace-rod pivoted to the outer strap and having an adjustable bearing on said lugs.

34. The combination with the outer strap, the frame having a web 3 and lugs 17 upon the web, of a plate 13 secured to the outer strap, a brace-rod 15 pivoted to said plate, the outer end of said brace-rod being threaded and lying between lugs 17 and a nut on said brace-rod which bears against the lugs and acts to support the straps and prevent curving or bowing of said straps in use.

35. The combination with the straps, and sectional band, of a rest comprising a clip which rests upon and partly incloses the straps and band and a plate adapted to slide on the clip and to engage the inner face of the band whereby the straps and band are held together, the rest is secured in place and a support is formed for the wheel and tire to be operated upon.

36. The combination with the straps and sectional band, of a rest comprising a clip having a head which rests upon the straps and band, a body which partly incloses the straps and band, a plate which lies within the band and is provided on its under side with a lug 22, a slide adapted to move upon said plate and provided with a lug 24 and a hand-screw which passes through lug 24 and engages lug 22 whereby the straps and band are held together, the rest is secured in place and a support is formed for the wheel and tire to be operated upon.

37. The combination with the sections of the band, the ends of which are provided respectively with projections and slots, of springs 31 secured to the sections and adapted to bear against a fixed part to separate the sections of the band.

38. The combination with the straps and sectional band, of a rest comprising a clip which rests upon and partly incloses the straps and band, a plate adapted to slide on the clip to retain the sections in place and springs 31 secured to the sections and bearing against the clips whereby the sections are forced endwise away from each other.

39. In a machine of the character described the combination with the frame and section C' of the inner band, of inside forming-plate F and means for setting said forming-plate up against the section of the band.

40. The combination with the frame, the straps and section C' of the inner band, of inside forming-plate F, a threaded rod pivoted to said forming-plate and passing through the frame and a hand-nut upon said rod by which the forming-plate is drawn against the inner face of the section of the band.

41. The combination with the straps and the frame, having webs 3 and shoulders 51, of outside forming-plate G having inclines 48 engaging one of the webs, and lugs 49 engaging the shoulders, arms 52 pivoted to said plate and to a nut 53 and a hand-screw 55 engaging said nut and other webs whereby both ends of said forming-plate may be forced against the straps simultaneously.

42. The combination with the frame, the straps, section C' of the inner band and an inside forming-plate for shaping said section of the band, of the sliding carriage to which the outer ends of the straps are connected, and the toggle.

43. The combination with the frame having slots 10, the straps having lugs engaging said slots and brace-rod 15 pivoted to the outer strap and having an adjustable bearing on the frame whereby bowing of the straps is prevented, of the sliding carriage to which the outer ends of the straps are connected and the toggle.

44. The combination with the frame and the straps connected thereto, of outside forming-plate G, mechanism for forcing both ends of said plate against the straps simultaneously, a sliding carriage to which the outer ends of the straps are connected and the toggle.

45. The combination with the frame, the straps connected thereto and a sectional band lying within the straps, of a sliding carriage to which the outer ends of the straps are connected, a toggle for moving the carriage in either direction to tighten or loosen the straps, and springs 31 acting to move the sections of the band endwise away from each other when strain upon the straps is relieved.

46. The combination with the frame and the straps, of the sliding carriage, the sliding frame, the toggle, toggle-operating mechanism carried by the frame, holding-plate 120 and mechanism intermediate said holding-plate and the toggle-operating mechanism whereby the movement of said mechanism to tighten the straps is stopped automatically.

47. The combination with the frame, and the straps, of the sliding carriage, the sliding frame, the toggle and toggle-operating mechanism carried by the frame, and mechanism actuated by contraction of the toggle to stop the toggle-operating mechanism automatically.

48. The combination with the frame and the straps connected thereto, of the sliding carriage having an opening through which the straps pass, a wedge having a straight and a convex face adapted to lie between the straps, a wedge having a correspondingly concave face engaging the outer strap by which said straps are locked to the carriage, the sliding frame and a toggle thereon by which the carriage is moved in either direction to tighten or loosen the straps.

49. The combination with the frame and the straps, of the sliding carriage, the sliding frame, the toggle, and fast and slow speed toggle-operating mechanism carried by the sliding frame.

50. The combination with the frame and the straps, of the sliding carriage, the sliding frame, a toggle, fast and slow speed toggle-operating mechanism and a driven shaft carried by the sliding frame, and clutch mechanism whereby power may be transmitted to either the fast or slow speed toggle-operating mechanism.

In testimony whereof I affix my signature in presence of two witnesses.

BERNARD McGOVERN.

Witnesses:
  A. M. WOOSTER,
  S. V. HELEY.